US 6,715,355 B2

(12) United States Patent
Vile et al.

(10) Patent No.: US 6,715,355 B2
(45) Date of Patent: Apr. 6, 2004

(54) PRESSURE MONITORING SYSTEM AND INFLATION VALVE USING SAME

(75) Inventors: David Vile, Upper Heyford (GB); John Beckley, Oxford (GB)

(73) Assignee: Transense Technologies plc (GB)

( * ) Notice: Subject to any disclaimer, the term of this patent is extended or adjusted under 35 U.S.C. 154(b) by 0 days.

(21) Appl. No.: 10/057,460

(22) Filed: Jan. 24, 2002

(65) Prior Publication Data

US 2002/0117005 A1 Aug. 29, 2002

Related U.S. Application Data

(63) Continuation of application No. PCT/GB00/02929, filed on Jul. 28, 1999.

(30) Foreign Application Priority Data

Jul. 28, 1999 (GB) .............................................. 9917579

(51) Int. Cl.7 .............................................. G01L 11/00
(52) U.S. Cl. ...................... 73/702; 73/146.2; 73/146.3; 73/146.8; 73/862.325
(58) Field of Search ................................ 73/702, 146.2, 73/146.3, 146.8, 862.325, 570

(56) References Cited

U.S. PATENT DOCUMENTS 4,975,679 A * 12/1990 Ballyns .................... 116/34 R
5,040,562 A * 8/1991 Achterholt .................. 137/227
5,289,160 A    2/1994 Fiorletta
5,585,571 A   12/1996 Lonsdale et al.
5,771,834 A *  6/1998 Hsiao ......................... 116/272

* cited by examiner

Primary Examiner—Edward Lefkowitz
Assistant Examiner—Alandra Ellington
(74) Attorney, Agent, or Firm—Keusey, Tutunjian & Bitetto, P.C.

(57) ABSTRACT

A pressure monitoring system has a first chamber (11) and a second chamber (12) separated by a diaphragm. The diaphragm carries respective SAW devices on the respective sides thereof, the SAW devices having different resonant frequencies. Variations in pressure within the second chamber (12) relative to the pressure within the first chamber (11) will cause deflection of the diaphragm and the resulting changes in resonant frequency of the SAW devices can be analyzed to indicate the pressure differential between the chambers. The pressure-measuring device is incorporated within a valve assembly for a vehicle tire. When the vehicle tire is inflated, the inflation pressure is trapped within the first chamber (11) as a reference. Any subsequent loss of pressure from the second chamber (12), e.g. as a result of a puncture, will cause deflection of the diaphragm and a corresponding output from the SAW devices.

20 Claims, 3 Drawing Sheets

PRESSURE MONITORING SYSTEM AND INFLATION VALVE USING SAME

CROSS REFERENCE TO RELATED APPARITIONS

This is a Continuation of International Application PCT/GB00/02929, with an International filing date of Jul. 28, 2000, that designates the United States and claims priority from GB application 9917579.6 filed Jul. 28, 1999.

FIELD OF THE INVENTION

This invention relates to a pressure monitoring system and, in particular, a system for monitoring the air pressure within a pneumatic wheel.

DESCRIPTION OF RELATED ART

A variety of pressure monitors have been proposed. U.S. Pat. No. 5,289,160 discloses a tire pressure monitoring system in which a pressure sensor switch closes if the tire pressure falls below a given valve relative to the external ambient pressure to trigger a warning system. The pressure sensitive switch comprises biasing means the action of which is resisted by the tire pressure but if the tire pressure falls too low relative to atmospheric pressure, the biasing means causes an electrical switch to dose so as to generate a warning signal. This system uses a surface acoustical wave (SAW) device as a transponder to transmit the warning signal to a remote sensor. The possibility of using a SAW device directly on a diaphragm to measure deflection of the diaphragm and thus provide a measure of the pressure acting on the diaphragm, relative to atmospheric pressure, is also mentioned.

U.S. Pat. No. 5,585,571 discloses apparatus for measuring strain by means of a pair of SAW devices. In one embodiment SAW devices are mounted on opposite sides of a diaphragm which is exposed to atmosphere on one side and to tire pressure on the other side. The signals from the two SAW devices are then mixed to provide a temperature compensated signal indicative of the tire pressure.

The present invention aims to improve upon these known systems.

SUMMARY OF THE INVENTION

According to a first aspect of the present invention, there is provided a pressure monitoring system comprising a first pressure chamber and a second pressure chamber separated by a diaphragm, a first SAW device having a first resonant frequency mounted on one side of the diaphragm and a second SAW device having a second resonant frequency mounted on the other side of the diaphragm, the first chamber being arranged to be pressurized to a predetermined pressure $P_1$ and to remain at that pressure and the second chamber being arranged to initially be pressurized to a pressure $P_2$ equal to pressure $P_1$ but being subject to change over time, whereby if the pressure $P_2$ in the second chamber falls or rises relative to the pressure $P_1$ in the first chamber, the diaphragm will deflect so one side thereof is subject to tension and the other side thereof is subject to compression, the first and second SAW devices being arranged to sense this deflection by sensing said tension and compression and hence providing an output indicative of the change of the pressure $P_2$ in the second chamber relative to the pressure $P_1$ in the first chamber.

Thus, the SAW devices can be used to provide a measure of the pressure differential between the two chambers, and the pressure in the first chamber can be set to, in effect, store the desired pressure. Thus, if the pressure in the second chamber (which may, for assistance, be in communication with the air pressure within a pneumatic wheel), falls relative to this stored pressure, a warning signal is generated by the pair of SAW devices. Furthermore, the SAW devices provide a temperature compensated signal and can be used as a transponder to transmit the warning signal to a remote sensor.

Preferred and optional features of the invention will be apparent from the following description and from the subsidiary claims of the specification.

BRIEF DESCRIPTION OF THE DRAWINGS

The invention will now be further described, merely by way of example, with reference to the accompanying drawings, in which.

DETAILED DESCRIPTION OF PREFERRED EMBODIMENTS

Figure 1A:
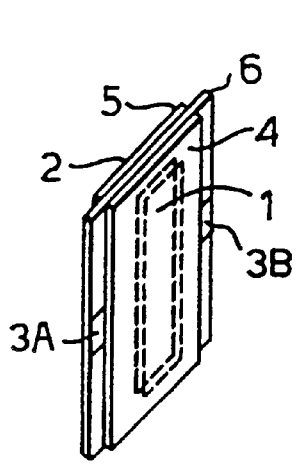
FIGS. 1A, 1B and 1C show passive strain sensitive SAW devices which may be used as the diaphragm in a system according to the invention.
Figure 1B:
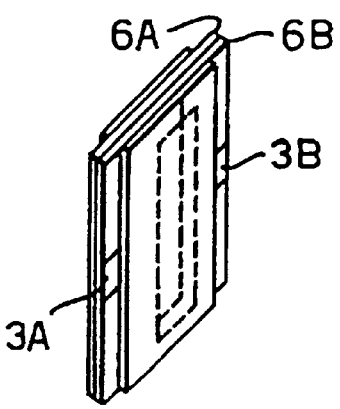
Figure 1C:
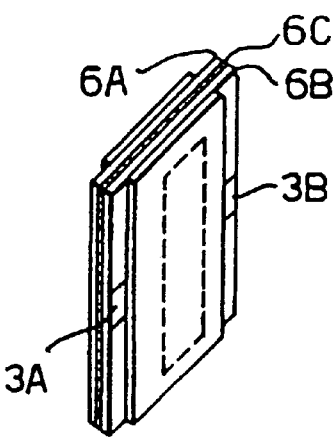

FIGS. 1A, 1B and 1C show first and second SAW devices 1, 2 mounted on opposite sides of a central substrate which may be used as a diaphragm. Each SAW device is housed within a cover 4, 5 which protects it from the environment and is mounted on opposite sides of a piezoelectric substrate 6 (such as quartz or thin film zinc oxide) as shown in FIG. 1A. The properties of the central substrate, e.g. it stiffness and/or electrical conductivity, can be altered by using a multiple layer substrate. FIG. 1B, shows the use of single-sided SAW devices mounted on piezoelectric substrates 6A, 6B mounted back to back and FIG. 1C, shows an embodiment in which a further structural layer 6C e.g. a metal or plastics layer, is used between the piezoelectric substrates 6A and 6B.

FIGS. 1A, 1B and 1C also show electrical connection pads 3A and 3B for connecting the SAW devices to an aerial and to a ground plane.

These devices may be fabricated and packaged in manner as described in our copending application No. GB9902341.8.

The use of two SAW devices, one on each side of the diaphragm, enables them to be operated as a differential strain sensor in the manner described in U.S. Pat. No. 5,585,571 the teaching of which is incorporated herein. As described therein, the two SAW devices are designed so they have slightly different resonant frequencies. By subtracting the output of one SAW device from the other a measurement of the differential strain can be determined and the output is temperature compensated as changes with temperature are effectively cancelled out. No separate measurement of temperature is thus required.

This arrangement contrasts with many conventional arrangements of SAW devices in which one device is used as a measuring element and another is used as a reference. With the differential arrangement, there is no need for a reference SAW and the sensitivity is increased as the two devices are subject to equal and opposite strains. Also, the diaphragm is normally unloaded (when the pressures on opposite sides thereof are equal) so avoiding ageing problems and enabling the measurement of higher pressures.

Figure 2:
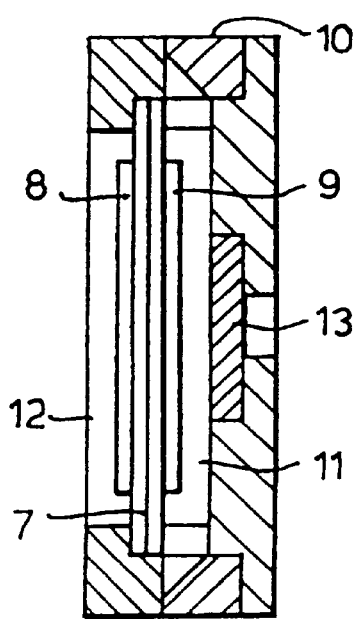
FIG. 2 is a cross-section of a first embodiment of a pressure monitoring system according to the present invention.

FIG. 2 shows an embodiment of the invention in which a diaphragm 7 is provided with a SAW device 8, 9 on opposite sides thereof, for example in the manner described in relation to FIGS. 1A, 1B and 1C, and mounted within a housing 10, e.g. formed of plastics. The housing 10 defines a first chamber 11 on one side of the diaphragm 7 and a second chamber 12 on the other side of the diaphragm. The diaphragm separates the two chambers 11 and 12 and provides a seal therebetween. The first chamber 11 is closed by a one-way valve 13 which lets air (or other gas) into the chamber 11 but prevents air from escaping from the chamber 11. The second chamber 12 is in communication with the pressure to be monitored.

The one-way valve may be a simple disk with a slot in it arranged to open when pressure is applied to one side thereof but other types of one-way valve may be used.

Figure 3:
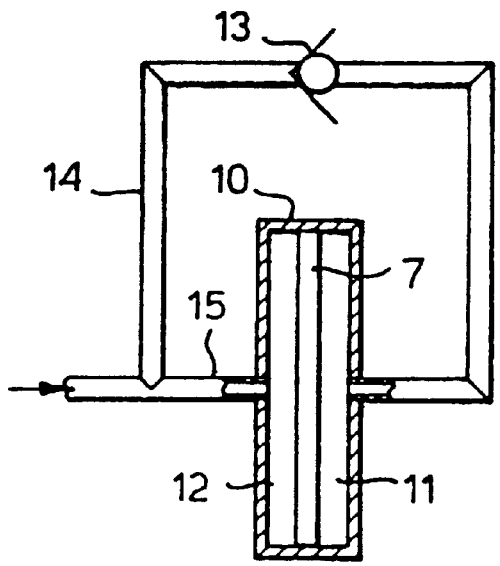
FIG. 3 is a schematic diagram illustrating how such a system may be used in practice.

FIG. 3 is schematic diagram illustrating the manner in which the pressure sensing system operates. It shows the diaphragm 7, housing 10 and chambers 11 and 12 as described above. The chambers 11 and 12 may be pressurized by a source of pressured air via conduits 14 and 15, with a non-return valve 13 shown in conduit 14.

When the system is first pressurized, the pressure $P_1$ in chamber 11 and the pressure $P_2$ in chamber 12 will be equal. Chamber 11 then, in effect, stores the value of $P_1$ as the one-way valve 13 prevents air escaping from chamber 11. Chamber 12, on the other hand, is in communication with the pressure to be monitored, e.g. the tire pressure, which may be subject to variation, e.g. due to slow leaks or puncture. If the pressure $P_2$ in chamber 12 falls relative to pressure $P_1$ in chamber 11, the diaphragm 7 will deflect and the SAW devices will sense this and provide a warning signal.

Such an arrangement can be used to monitor tire pressure. When the tire is initially inflated, chamber 11 stores the initial pressure and if, over time, the pressure $P_2$ in chamber 11 falls relative to this stored pressure a warning signal is generated. If the tire is over-inflated initially, this simple embodiment would store the incorrect, over inflated pressure in chamber 11. However, this problem can be avoided by using an inflator which can be pre-set to inflate the tire to a selected pressure.

Figure 4:
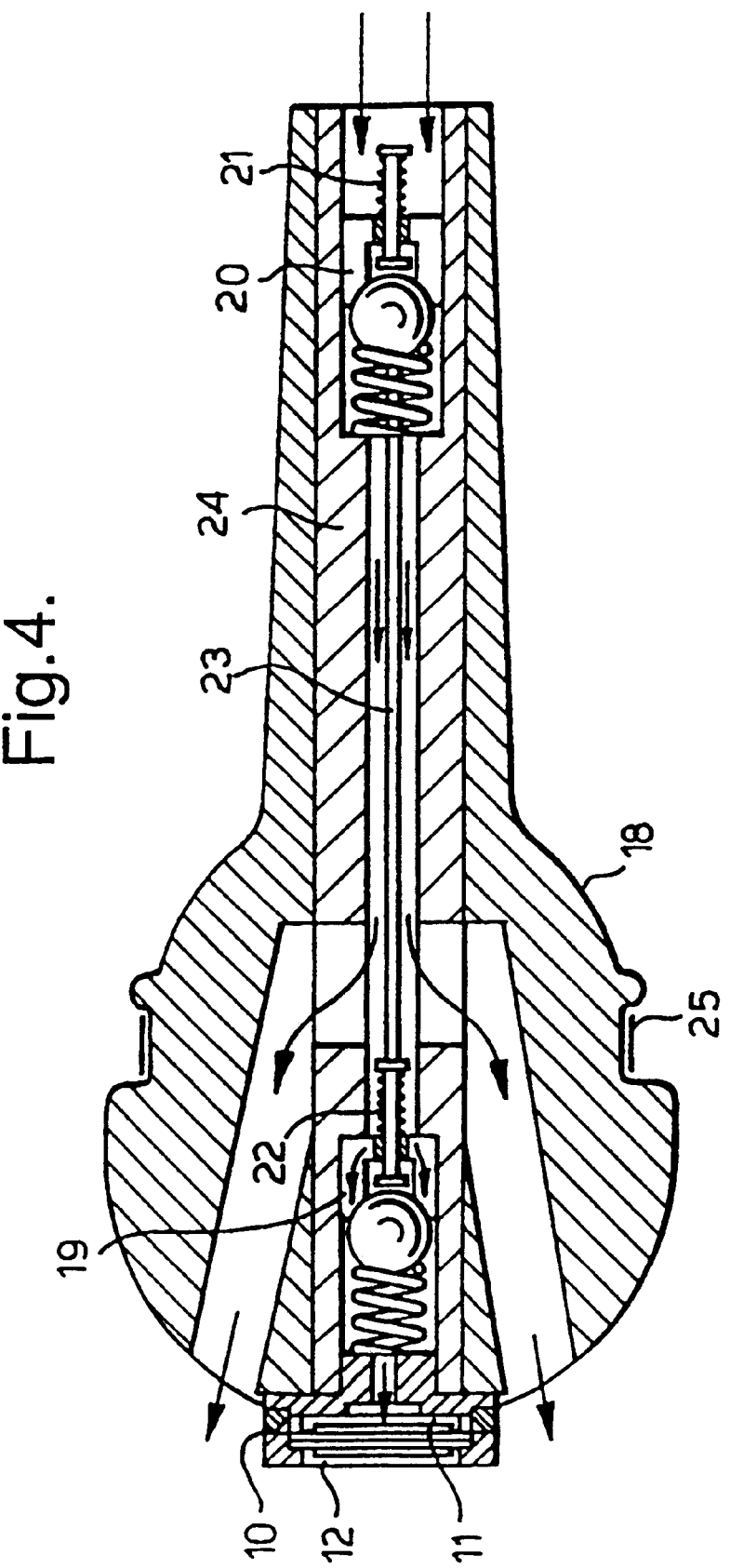
FIG. 4 is a cross-sectional view of a valve incorporating such a pressure monitoring system.

FIG. 4 is a cross-sectional view of an embodiment of a valve, such as a vehicle wheel valve, incorporating a pressure monitor as described above. The pressure monitor is mounted at the inner end of the valve body 18. A first Schraeder valve 19 is provided to function as the one-way valve 13 shown in FIG. 3 enabling air to enter the first chamber 11 but not to escape therefrom. A second Schraeder valve 20 is provided as in a conventional inflation valve for a pneumatic tire to allow the tire to be inflated but prevent air escaping through the valve except by activating a release rod 21 by means of which the valve can be opened for two-way communication. It is advantageous to link the two Schraeder valves 19 and 20 so that actuation of the release rod 21 also actuates a release rod 22 of the first valve 19 via connecting rod 23. Thus, if the tire is over inflated and air is let out through valve 20 by actuating release rod 21, the valve 19 will also be opened to allow air to escape from chamber 11 so that it does not store the over pressure.

It will be appreciated that the pressure monitor device can be easily re-calibrated by simply inflating the tire to the required pressure as the first chamber 11 automatically stores the peak inflation pressure.

The arrows shown in FIG. 4 show the path of air used to inflate the tire and pressure chamber 11 at the same time.

Figure 5:
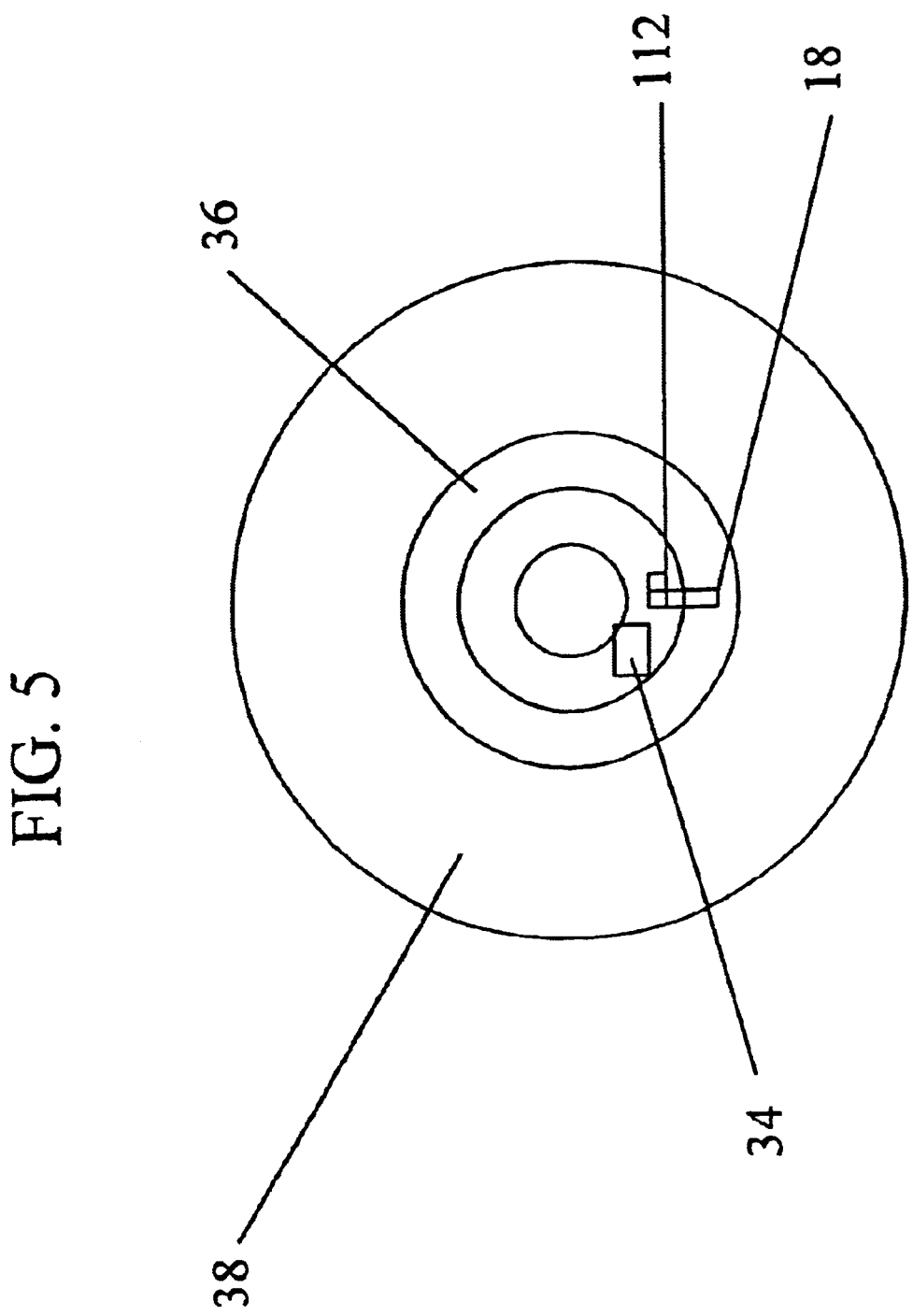
FIG. 5 is a schematic diagram showing a sensor/transponder of the pressure monitoring system for use on vehicles in accordance with the present invention.

An advantage of using SAW devices on piezoelectric substrate is that they can store and convert energy without the requirement of an external power source such as a battery and wireless radio frequency signals can be used to interrogate the devices as described in U.S. Pat. No. 5,585,571. Also, as shown in FIG. 5, the SAW devices or transponders 112 need only be connected to an aerial and a ground plane to enable them to transmit signals to a remote sensor 34, no other circuitry being required. If desired, a small processing circuit (not shown) may be mounted within the valve body 18 to process the signals received from the SAW devices. FIG. 4 shows metal insert 24 running the length of the valve body 18, which provides an aerial. A ground plane connection is provided by a metalized ring 25 around the body 18 which, in use, contacts a metal wheel 36 (FIG. 5) in which the valve 18 is inserted, (the electrical connections between these components and the connection pads 3A, 3B of the SAW devices are not shown in this figure).

Signals from the SAW devices can thus be transmitted to remote sensors 34, e.g. sensors built into the vehicle in the vicinity of the wheels and arranged to provide a warning signal on the vehicle dashboard. The SAW devices may also be arranged so that each sensor provides an unique output identifying which sensor is producing a warning signal so that the warning can indicate which wheel or wheels is causing a problem. The monitor described above can thus provide an inexpensive, compact device for measuring tire pressure for a tire 38. The device is so small and lightweight that its effect on the performance of the wheel is negligible. Yet it can provide warning of low pressure in a tire and is capable of sensing a small drop in pressure, e.g. of 1 or 2 pounds per square inch ($6.9$–$13.8 \times 10^3$ $NT/M^2$), so can provide a warning of problems such as a slow puncture. It can also provide a warning of a sudden loss of pressure, e.g. due to a puncture, in situations where it is not immediately apparent to a driver, e.g. of a lorry tire, trailer tire or of a spare tire.

What is claimed is:

1. A pressure monitoring system comprising a first pressure chamber and a second pressure chamber separated by a diaphragm, a first surface acoustical wave (SAW) device having a first resonant frequency mounted on one side of the diaphragm and a second SAW device having a second resonant frequency mounted on the other side of the diaphragm, the first chamber being arranged to be pressurized to a predetermined pressure $P_1$ and to remain at that pressure and the second chamber being arranged to initially be pressurized to a pressure $P_2$ equal to pressure $P_1$ but being subject to change over time, whereby if the pressure $P_2$ in the second chamber falls or rises relative to the pressure $P_1$ in the first chamber, the diaphragm will deflect so one side thereof is subject to tension and the other side thereof is subject to compression, the first and second SAW devices being arranged to sense this deflection by sensing said tension and compression and hence provide an output indicative of the change of the pressure $P_2$ in the second chamber relative to the pressure $P_1$ in the first chamber and wherein the system provides wireless communication between the system and a remote sensor.

2. A pressure monitoring system as claimed in claim 1 in which the diaphragm comprises one or more layers of a piezoelectric material.

3. A pressure monitoring system as claimed in claim 1 in which the first chamber is provided with a first one-way valve which prevents air leaving the chamber.

4. A pressure monitoring system as claimed in claim 1 comprising processing means arranged to sense a difference of the outputs between the output of the first SAW device and the output of the second SAW device to provide an indication of the pressure differential between the first and second chambers.

5. A pressure monitoring system as claimed in claim 4 in which the processing means is arranged to generate a warning signal when a pressure differential greater than a given level is detected.

6. A pressure monitoring system as claimed in claim 1, wherein the pressure monitoring system is included in an inflation valve.

7. A pressure monitoring system as claimed in claim 6 in which the first chamber is provided with a first one-way valve which prevents air leaving the chamber and having a second one-way valve through which inflation air is provided and having a release mechanism which may be actuated to prevent flow of air therethrough in the opposite direction.

8. A pressure monitoring system as claimed in claim 7 in which the first one-way valve also has a release mechanism to permit air to escape from the first chamber, the first and second one-way valves being interconnected so actuation of the release mechanism of the second one-way also actuates the release mechanism of the first one-way valve.

9. A pressure monitoring system as claimed in claim 6 comprising a metal insert to function as an aerial.

10. A pressure monitoring system as claimed in claim 6 wherein the pressure monitoring system is included in a pneumatic inflation valve for a pneumatic tire.

11. A pressure monitoring system as claimed in claim 10, wherein the pneumatic inflation valve is coupled to the pneumatic tire.

12. An inflation valve including a pressure monitoring system, the pressure monitoring system comprising:
   a first pressure chamber and a second pressure chamber separated by a diaphragm; and
   a first surface acoustical wave (SAW) device having a first resonant frequency mounted on one side of the diaphragm and a second SAW device having a second resonant frequency mounted on the other side of the diaphragm, the first chamber being arranged to be pressurized to a predetermined pressure $P_1$ and to remain at that pressure and the second chamber being arranged to initially be pressurized to a pressure $P_2$ equal to pressure $P_1$ but being subject to change over time, whereby if the pressure $P_2$ in the second chamber falls or rises relative to the pressure $P_1$ in the first chamber, the diaphragm will deflect so one side thereof is subject to tension and the other side thereof is subject to compression,
   the first and second SAW devices being arranged to sense this deflection by sensing said tension and compression and hence provide an output indicative of the change of the pressure $P_2$ in the second chamber relative to the pressure $P_1$ in the first chamber.

13. An inflation valve as claimed in claim 12 in which the diaphragm comprises one or more layers of a piezoelectric material.

14. An inflation valve as claimed in claim 12 in which the first chamber is provided with a first one-way valve which prevents air leaving the chamber.

15. An inflation valve as claimed in claim 12 comprising processing means arranged to subtract the outputs between the first SAW device and the output of the second SAW device to provide an indication of the pressure differential between the first and second chambers.

16. An inflation valve as claimed in claim 12 comprising a transponder for providing wireless communication between the system and a remote sensor.

17. An inflation valve as claimed in claim 12 wherein the first chamber is provided with a first one-way valve which prevents air leaving the chamber and having a second one-way valve through which inflation air is provided and having a release mechanism which may be actuated to prevent flow of air therethrough in the opposite direction.

18. An inflation valve as claimed in claim 17 in which the first one-way valve also has a release mechanism to permit air to escape from the first chamber, the first and second one-way valves being interconnected so actuation of the release mechanism of the second one-way also actuates the release mechanism of the first one-way valve.

19. An inflation valve as claimed in claim 13 which comprises the inflation valve for a pneumatic tire.

20. A pressure monitoring system comprising a first pressure chamber and a second pressure chamber separated by a diaphragm, a first surface acoustical wave (SAW) device having a first resonant frequency mounted on one side of the diaphragm and a second SAW device having a second resonant frequency mounted on the other side of the diaphragm, the first chamber being arranged to be pressurized to a predetermined pressure $P_1$ and to remain at that pressure and the second chamber being arranged to initially be pressurized to a pressure $P_2$ equal to pressure $P_1$ but being subject to change over time, whereby if the pressure $P_2$ in the second chamber falls or rises relative to the pressure $P_1$ in the first chamber, the diaphragm will deflect so one side thereof is subject to tension and the other side thereof is subject to compression, the first and second SAW devices being arranged to sense this deflection by sensing said tension and compression and hence provide an output indicative of the change of the pressure $P_2$ in the second chamber relative to the pressure $P_1$ in the first chamber; and processing means arranged to sense a difference of the outputs between the output of the first SAW device and the output of the second SAW device to provide an indication of the pressure differential between the first and second chambers in which the processing means is arranged to generate a warning signal when a pressure differential greater than a given level is detected.

* * * * *